United States Patent [19]
Robinson

[11] Patent Number: 5,682,497
[45] Date of Patent: Oct. 28, 1997

[54] MANAGING FILE STRUCTURES FOR A FLASH MEMORY FILE SYSTEM IN A COMPUTER

[75] Inventor: Kurt B. Robinson, Newcastle, Calif.

[73] Assignee: Intel Corporation, Santa Clara, Calif.

[21] Appl. No.: 629,762

[22] Filed: Apr. 8, 1996

Related U.S. Application Data

[63] Continuation of Ser. No. 128,545, Sep. 28, 1993, abandoned.

[51] Int. Cl.⁶ .................................................. G06F 12/00
[52] U.S. Cl. ............... 395/430; 395/497.01; 395/462; 395/612; 395/622; 395/621; 364/DIG. 1; 364/260.6; 364/281.1; 364/282.2
[58] Field of Search .......................... 395/430, 497.01, 395/462, 612, 621, 622; 364/DIG. 1

[56] References Cited

U.S. PATENT DOCUMENTS

| | | | |
|---|---|---|---|
| 4,775,932 | 10/1988 | Oxley et al. | 364/200 |
| 4,800,520 | 1/1989 | Iijima | 364/900 |
| 4,907,151 | 3/1990 | Bartlett | 364/200 |
| 5,247,658 | 9/1993 | Barrett et al. | 395/600 |
| 5,392,427 | 2/1995 | Barrett et al. | 395/600 |
| 5,509,134 | 4/1996 | Fandrich et al. | 395/430 |
| 5,544,356 | 8/1996 | Robinson et al. | 395/600 |
| 5,559,956 | 9/1996 | Sukegawa | 395/182.06 |
| 5,559,978 | 9/1996 | Spilo | 395/413 |
| 5,561,785 | 10/1996 | Blandy et al. | 395/497.01 |
| 5,561,786 | 10/1996 | Morse | 395/497.01 |

FOREIGN PATENT DOCUMENTS

| | | |
|---|---|---|
| 0175458 | 7/1985 | European Pat. Off. . |
| 2251323 | 9/1991 | United Kingdom . |
| 2251324 | 11/1991 | United Kingdom . |

*Primary Examiner*—Thomas G. Black
*Assistant Examiner*—Jean R. Homere
*Attorney, Agent, or Firm*—Blakely, Sokoloff, Taylor & Zafman

[57] ABSTRACT

A method for compressing a set of file structures in a flash memory subsystem is disclosed. During a clean-up operation, a sibling chain of the file structures stored in a logical block of the flash memory subsystem is traversed. If a file structure is followed by deleted file structures in the sibling chain, then the file structure is transferred to a spare logical block and the sibling pointer of the file structure is programmed bypass the deleted file structures. If a deleted file structure in the sibling chain is referenced by a previous file structure in the sibling chain, then the deleted file structure is transferred to the logical block and recycled.

33 Claims, 12 Drawing Sheets

| FE STATUS |
|---|
| FE SIBLING POINTER |
| FE PRIMARY CHILD POINTER |
| FE SECONDARY CHILD POINTER |
| FE ATTRIBUTES |
| FE TIME |
| FE DATE |
| FE FILE NAME |
| FE FILE NAME EXTENSION |

MANAGING FILE STRUCTURES FOR A FLASH MEMORY FILE SYSTEM IN A COMPUTER

This is a continuation of application Ser. No. 08/128,545, filed Sep. 28, 1993, now abandoned.

BACKGROUND OF THE INVENTION

1. Field of the Invention

The present invention pertains to the field of computer systems. More particularly, this invention relates to a method for managing the file structures of a file system hierarchy in a flash memory subsystem.

2. Art Background

A computer system may implement a file system in a flash memory subsystem. Such a flash memory file system is a substitute for a disk drive based file system, or a supplement to a disk drive based file system. Such a flash memory file system enables a central processing unit (CPU) of the computer system to create and modify, read, write, and delete files in the flash memory subsystem.

A flash memory subsystem provides large scale non volatile random access data storage. A typical flash memory subsystem is comprised of a set of flash memory devices. Flash memory devices may also be referred to as a flash electrically erasable programmable read only memories (flash EEPROMs).

A flash memory based file system has several advantages over a disk drive based file system. For example, a flash memory subsystem may be directly memory mapped into the address space of the CPU. Such direct memory mapping simplifies the hardware interface between the CPU and the flash memory subsystem. As a consequence, a typical flash memory subsystem does not require the complex interface controller required by typical disk drives. In addition, flash memory devices usually provides faster read access than disk drives.

Typically, the file management software for such a flash memory file system implements a write once read many (WORM) type file system because flash memory devices are usually not byte and word alterable. The individual bit cells in a flash memory device are typically programmed to a logic state zero in either bit, byte or word write operations. Thereafter, an erase operation on the flash memory device is usually required to change the programmed bit cells from logic zero to logic one. Typically, an erase operation on a flash memory device erases an entire block of flash cells.

A typical WORM type file system writes file structures that define a file into the storage media. Such a WORM type file system typically modifies the file by writing modified file structures to an unused area of the storage media, and by deleting the file structures corresponding to the original file.

One prior flash memory file system implements a WORM type file system that subdivides the flash memory address space into a set of logical blocks. At least one of the logical blocks is assigned as a "spare" logical block. Such a prior flash memory file system writes file structures into available areas of the logical blocks as files and directories are created and modified. The file structures include file entry structures, directory entry structures, file information structures and extent blocks.

The file entry, directory entry and file information structures in such a prior flash memory file system comprise a linked list of file structures that define a file system hierarchy. Each file entry and directory entry structure contains sibling and child pointers that define the linked list.

Files are created in the flash memory subsystem by searching the linked list for an end of the appropriate hierarchical chain, and then writing a file entry structure along with one or more file information structures and corresponding extent blocks into the flash memory subsystem. The pointers of the existing file structures are updated and the pointers of the new file structures are written to maintain the linked list hierarchy.

When a file is modified in such a file system, the fie structures for the modified file are written to a free area of the flash memory subsystem because the existing file structures cannot be overwritten. The existing file structures are marked as deleted. Some of the deleted file structures are eventually discarded during a clean-up operation.

In such a prior flash memory file system, clean-up operations are performed on individual logical blocks of the flash memory subsystem. During clean-up, the file structures in a logical block are compressed by transferring the file structures to a spare logical block while discarding deleted file information structures and deleted extent blocks. The logical block is then erased and becomes available as a new spare logical block.

During the clean-up operation in such a prior flash memory file system, deleted file entry and directory entry structures are copied to the spare logical block. The deleted file entry and directory entry structures are not discarded because file entry or directory entry data structures external to the logical block may reference the deleted file structures. An elimination of such deleted file structures would break the linked list that defines the flash file hierarchy.

Unfortunately, such an accumulation of deleted file structures consumes the available storage area in the flash memory subsystem that could otherwise be allocated for new files. Moreover, the accumulation of such deleted file structures increases the length of the linked list chains in the flash file hierarchy. As files are modified over time, the linked list chains become extremely long. Such long chains increase the time required for the CPU to transverse the chains when accessing file structures in the flash memory file system. As a consequence, the throughput to the flash memory subsystem severely decreases over time.

SUMMARY AND OBJECTS OF THE INVENTION

One object of the present invention is to prevent degradation in the performance of a flash memory file system caused by unnecessary expansion of linked lists in the flash file system hierarchy.

Another object of the present invention is to collapse the linked list chains in the flash file systems hierarchy during a clean-up operation on a logical block by modifying sibling pointers in undeleted file structures to bypass subsequent deleted file structures in the sibling chain.

A further object of the present invention is to recycle deleted file structures in the linked list chains during clean-up of the logical block if the deleted file structures are referenced by file structures external to the logical block.

Another object of the present invention is to recycle deleted file structures by transferring the deleted file structures from the logical block to a spare logical block as recycled file structures and by setting null child pointers for the recycled file structures, such that the null child pointers indicate that the corresponding recycled file structures are available for new and modified files.

Another object of the present invention is to provide a proactive clean-up process for a flash memory file system, wherein the proactive clean-up process eliminates deleted file entry and directory entry structures and recycles file entry and directory entry structures that are referenced by external file structures.

These and other objects of the invention are provided by a method for compressing a set of file structures in a flash memory subsystem. A central processing unit (CPU) executing flash file system software for a computer system performs a clean-up operation on logical blocks in the flash memory subsystem. During the clean-up operation on a logical block, the CPU accesses a next file structure from the file structures by traversing a sibling chain of the file structures from current file structures stored in the logical block undergoing clean-up. The sibling chain is specified by a sibling pointer stored in each file structure.

If the next file structure is not deleted, the CPU accesses a next undeleted file structure from the file structures by traversing ahead through the sibling chain. The CPU then transfers the current file structure to the spare logical block and programs its sibling pointer for the next file structure in the spare logical block to point to the next undeleted file structure in the sibling chain.

If the current file structure is deleted, the CPU transfers the current file structure to the spare logical block and sets its child pointer in the spare logical block to null. The null child pointer indicates a recyclable file structure that is programmable without prior erasure.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 7 illustrates the format of a file entry structure which comprises a FE status, FE sibling pointer, FE child pointer, and a set of FE parameters;

DETAILED DESCRIPTION

Figure 1:
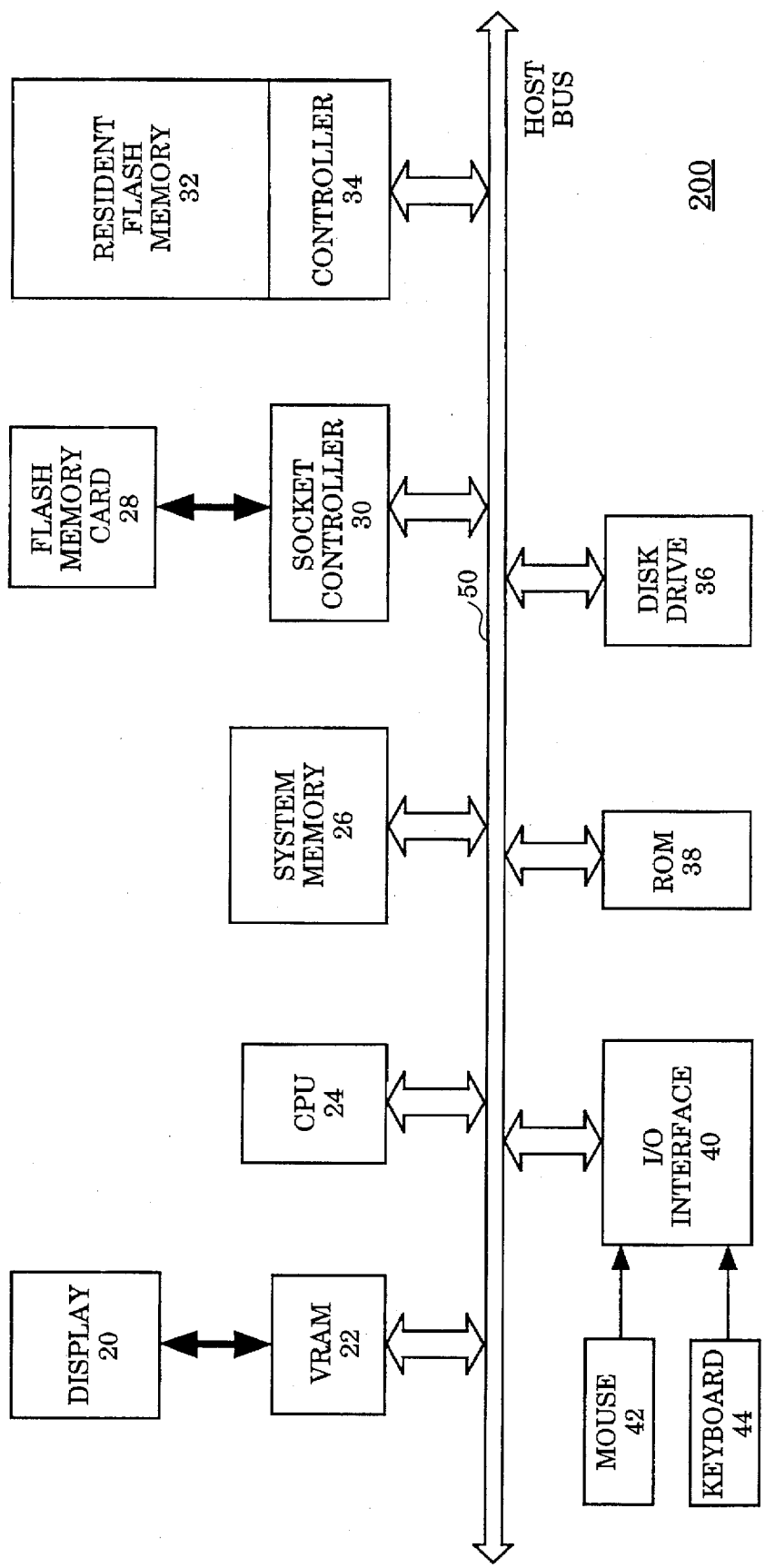
FIG. 1 illustrates a computer system which comprises a central processing unit (CPU), a system memory, a flash memory card and a resident flash memory each comprising a plurality of flash memory devices.

FIG. 1 illustrates a computer system 200. The computer system 200 comprises a central processing unit (CPU) 24, a system memory 26, and a flash memory card 28.

The flash memory card 28 provides large scale random access information storage for the computer system 200. The flash memory card 28 is memory mapped to the CPU 24 over a host bus 50.

The flash memory card 28 comprises a plurality of flash memory devices. The CPU 24 accesses the flash memory card 28 through a socket controller 30. The flash memory card 28 is memory mapped to the CPU 24 over the host bus 50 through the socket controller 30. For one embodiment the flash memory card 28 and the socket controller 30 conform to a Personal Computer Memory Card International Association (PCMCIA) standard.

The computer system 200 includes a resident flash memory 32 and a resident flash array (RFA) controller 34. The resident flash memory 32 comprises a plurality of flash memory devices. The resident flash memory 32 is memory mapped to the CPU 24 over the host bus 50 through the RFA controller 34.

The computer system 200 further comprises a display device 20 which is coupled to a video random access memory (VRAM) subsystem 22. The CPU 24 loads the VRAM subsystem 22 over the host bus 50.

The computer system 200 further comprises a disk drive 36. The computer system 200 further comprises an input/output (I/O) interface circuit 40 which provides an interface for a mouse pointing device 42 and a keyboard device 44.

A read only memory (ROM) 38 provides firmware storage for the computer system 200. The ROM 38 stores the basic input/output system (BIOS) module for the computer system 200. The BIOS stores drivers for hardware devices such as the mouse 42, the keyboard 44 and the disk drive 36. The BIOS also contains a start-up routine for initializing the computer system 200.

For one embodiment, the operating system for the computer system 200 is loaded from the disk drive 36. For another embodiment, the operating system is loaded from the resident flash memory 32.

For one embodiment, the operating system for the computer system 200 is MS DOS sold by Microsoft Corporation of Redmond, Wash. The MS DOS operating system comprises a loader program, an MS DOS BIOS, an MS DOS kernel, a user interface and a set of utility programs.

Figure 2:
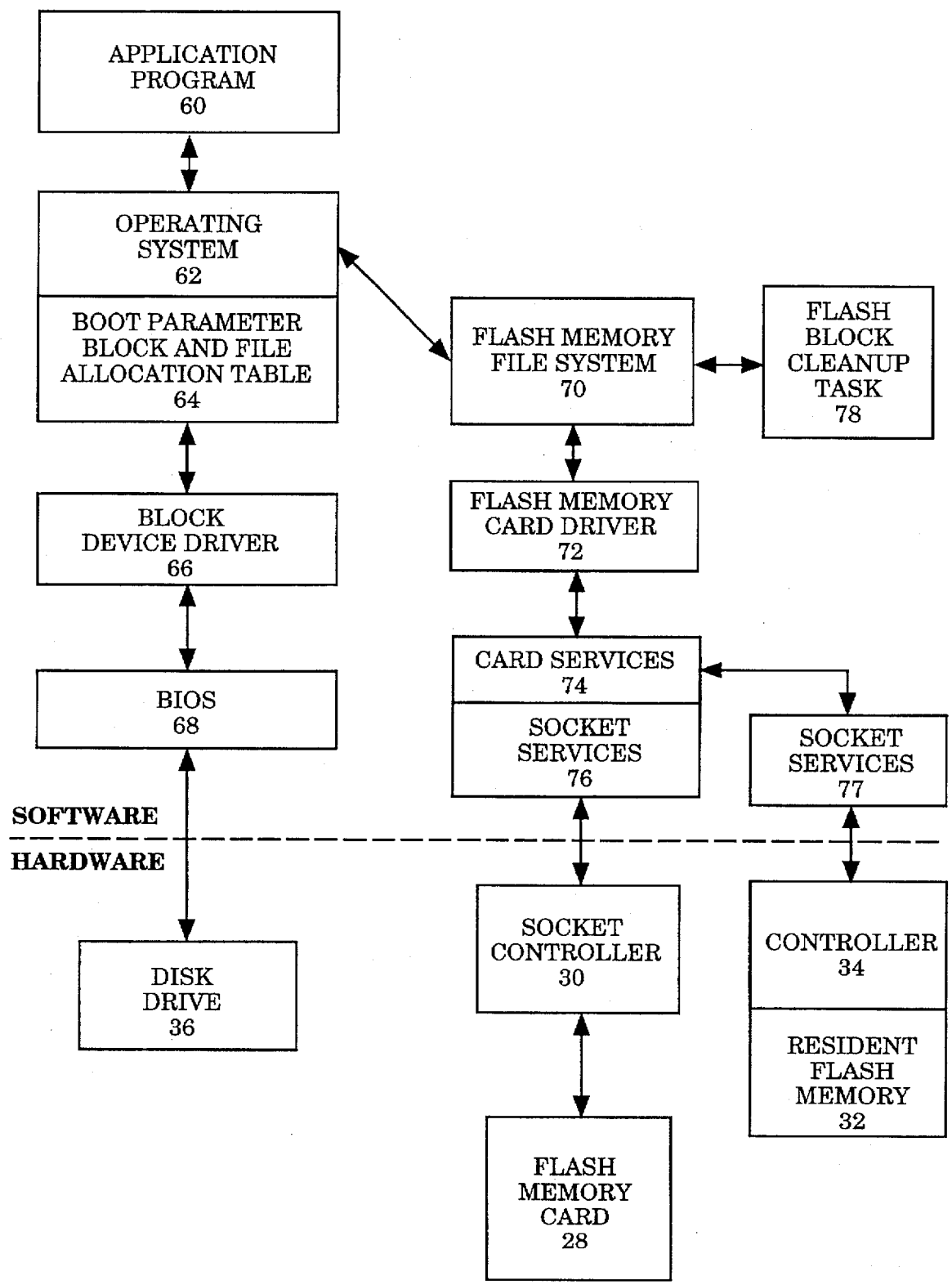
FIG. 2 illustrates the software architecture of the computer system which includes an operating system, at least one application program, a flash memory file system, and a flash block clean-up task.

FIG. 2 illustrates a software architecture for the computer system 200 for one embodiment. The software for the computer system 200 includes an operating system 62, a boot parameter block and file allocation table 64, a block device driver 66 and a BIOS 68. The software for the computer system 200 also includes one or more application programs including an application program 60.

The application program 60 issues file requests to the operating system 62. The file requests include requests to open, to close, to read and write, and to create directories and files. The file requests from the application program 60 specify files and directories contained in either the disk drive 36, the flash memory card 28, or the resident flash memory 32.

The file allocation table 64 maps the files structures on the disk drive 36, the flash memory card 28, and the resident flash memory 32 to the operating system 62. The operating system 62 handles file requests from the application program 60 for files on the disk drive 36 by reading the file allocation table 64 and accessing the file structure on the disk drive 36 through the block device driver 66 and the BIOS 68. The BIOS 68 includes a low level device driver for the disk drive 36.

The file allocation table 64 redirects file requests for the flash memory card 28 and the resident flash memory 32 to a flash memory file system 70. For one embodiment, the flash memory file system 70 is an installable file system under MS DOS.

The flash memory file system 70 accesses the file systems on the flash memory card 28 and the resident flash memory 32 through a flash memory card driver 72. The flash memory card driver 72 processes requests to open, to close, to read and write, and to create directories and files on the flash memory card 28 or the resident flash memory 32.

The flash memory card driver 72 reads and write the flash memory card 28 by employing a set of card services 74 and a set of socket services 76. The card services 74 are employed to allocate resources in the flash memory card 28. The socket services 76 perform hardware functions specific to the socket controller 30.

The flash memory card driver 72 reads and write the resident flash memory 32 by employing the card services 74 and a set of socket services 77. The card services 74 are employed to allocate resources in the resident flash memory 32, and the socket services 77 perform hardware functions specific to the RFA controller 34.

A flash block clean-up task 78 performs proactive clean-up operations on the file structures stored in the flash memory card 28 and the resident flash memory 32. The flash block clean-up task 78 accesses the file structures on the flash memory card 28 and the resident flash memory 32 using the flash memory card driver 72.

Figure 3:
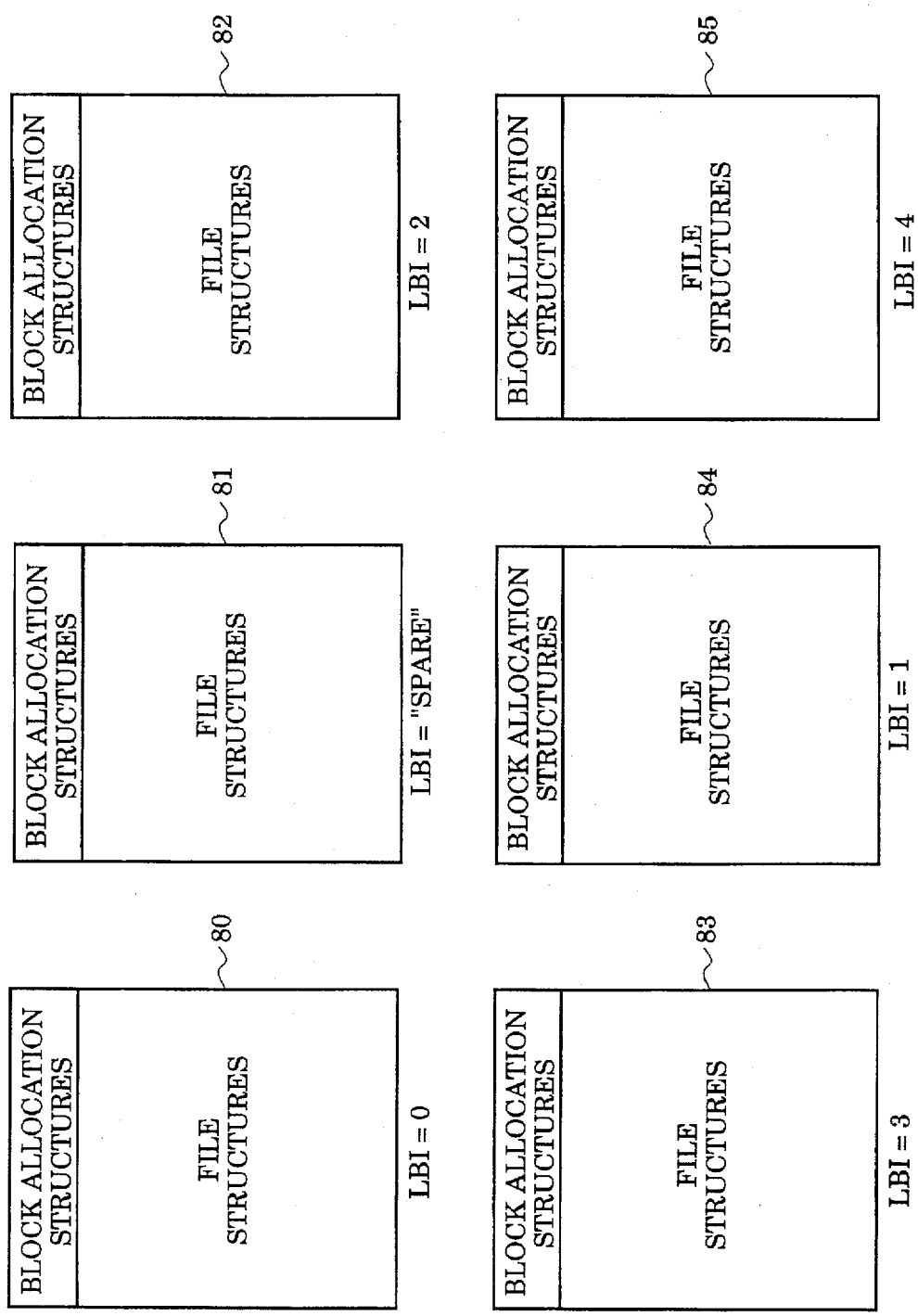
FIG. 3 illustrates the architecture of the flash memory card for one embodiment.

FIG. 3 illustrates an architecture of the flash memory card 28 for one embodiment. The architecture of the resident flash memory 32 is substantially similar. The memory address space of flash memory card 28 is subdivided into a set of logical blocks 80–85. For one embodiment, each logical block 80–85 comprises a 64 k or 128 k flash memory array.

The logical blocks 80–85 are each identified by a corresponding logical block identifier (LBI). The CPU 24 programs a logical block identifier into each of the logical blocks 80–85. For the example shown, the logical block 80 is programmed with an LBI=0, the logical block 82 with an LBI=2, etc. The CPU 24 programs the logical block identifier of the logical block 81 to indicate a spare logical block (LBI="SPARE"). The flash memory file system 70 and the flash memory card driver 72 maintains a base physical address for each of the logical blocks 80–85.

Each logical block 80–85 contains a set of block allocation structures and a set of file structures that are maintained by the flash memory file system 70 and the flash memory card driver 72. The file structures comprise the file system for the flash memory card 28 and the block allocation structures provide a logical reference to physical address mapping for the file structures.

The file structures in each logical block 80–85 include directory entry structures that specify directories, file entry structures that specify files, and file information structures with corresponding extent blocks that store file data. The directory entry and file entry data structures form a linked list file structure that defines a file system hierarchy. The file information structures link the extent blocks to the file system hierarchy.

The block allocation structures in each logical block 80–85 store physical address offsets for the file structures. Each physical address offset of a block allocation structure provides a physical address mapping to the start of a corresponding file structure. The flash memory file system 70 and the flash memory card driver 72 access the block allocation structures to determine physical addresses of file structures stored in the flash memory card 28.

The flash memory file system 70 and the flash memory card driver 72 reference the file structures in each logical block 80–85 using a logical reference. A logical reference comprises a logical block number and a logical pointer. The logical block number specifies one of the logical block identifiers of the logical blocks 80–85. The logical pointer specifies one of the block allocation structures in the specified logical block 80–85.

For example, a logical reference equal to 0:1 specifies a file structure in the logical block 80 that corresponds to a block allocation structure 1 in the logical block 80. Similarly, a logical reference equal to 4:0 specifies a file structure in the logical block 85 that corresponds to a block allocation structure 0 in the logical block 85.

During a clean-up operation on one of the logical blocks 80–85, the CPU 24 transfers information from the corresponding block allocation structures and file structures to the SPARE logical block. The CPU 24 compresses the file structures into the SPARE logical block by discarding deleted file information structures and extent blocks. The CPU 24 also compresses the file structures by modifying the linked list hierarchy to eliminate deleted file entry and directory entry structures and to recycle deleted file entry and directory entry structures. The CPU 24 then reprograms the logical block identifier of the SPARE logical block to reflect the logical block identifier of the cleaned-up block, and then initiates an erase operation on the cleaned-up logical block. After completion of the erase operation, the CPU 24 programs the logical block identifier of the cleaned-up block to LBI=SPARE.

For example, the CPU 24 deans up the logical block 80 by compressing the corresponding block allocation structures and file structures to the logical block 81 (the current SPARE logical block). The CPU 24 then programs the logical block identifier of the logical block 81 to LBI=0 (the logical block identifier of the cleaned-up block), and then initiates an erase operation on the logical block 80 (the cleaned-up block). After completion of the erase operation on the logical block 80, the CPU 24 programs the logical block identifier of the logical block 80 to LBI=SPARE.

Figure 4:
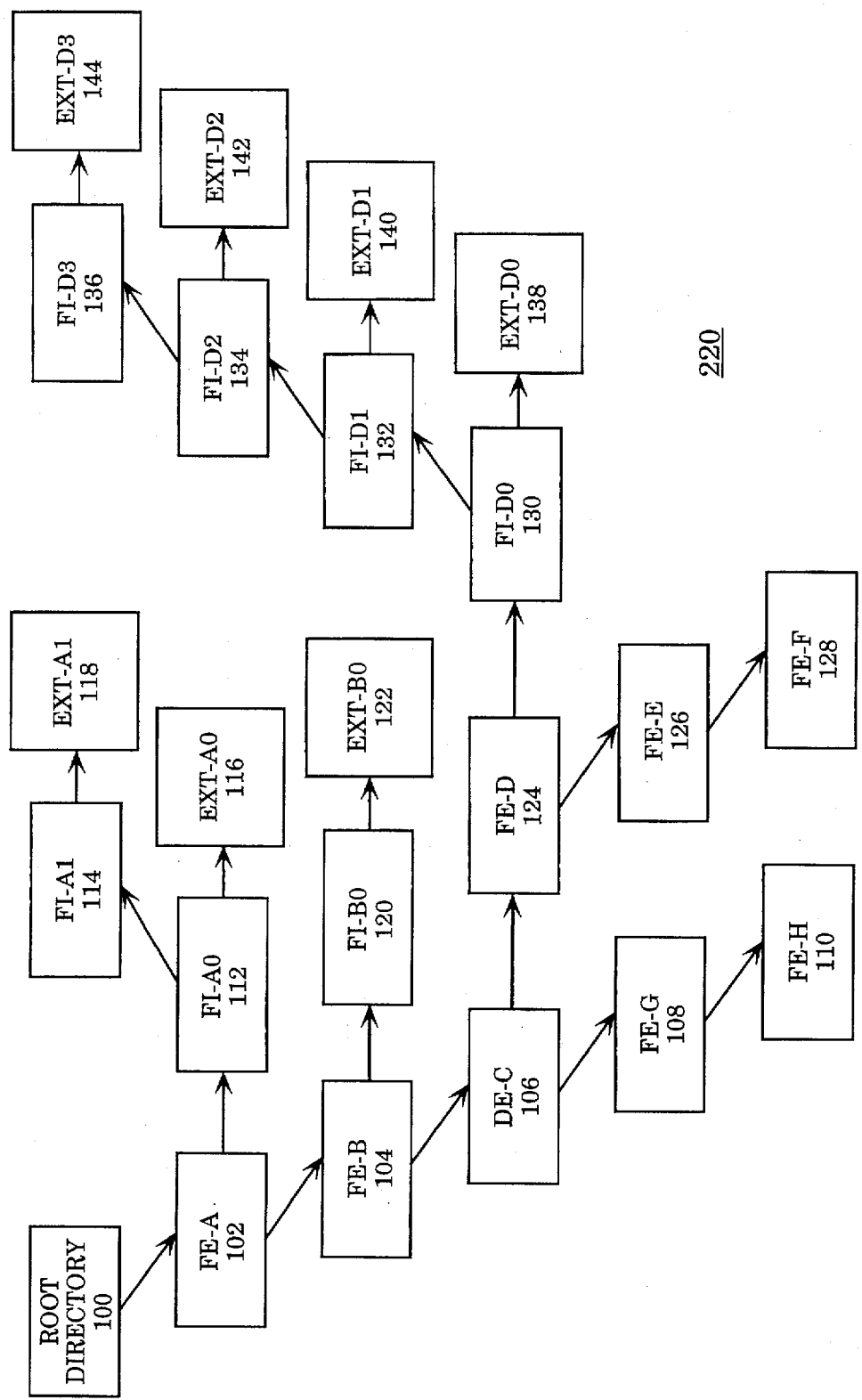
FIG. 4 illustrates an example file system hierarchy in the flash memory card or the resident flash memory which comprises a root directory, and a set of file entry structures, directory entry structures, file information structures and extent blocks.

FIG. 4 illustrates an example file system hierarchy 220 in the flash memory card 28 or the resident flash memory 32. The file system hierarchy 220 comprises a root directory 100, a set of file entry structures, directory entry structures, file information structures and extent blocks. Each file entry (FE) structure contains information for a corresponding file. Each directory entry (DE) structure contains information for a corresponding directory. Each file information (FI) structures links an extent (EXT) block to a corresponding file entry structure. Each extent block stores data for a corresponding file.

File A in the file system hierarchy 220 comprises the file entry structure 102, along with the file information structures 112 and 114 and corresponding extent blocks 116 and 118. File B in the file system hierarchy 220 comprises the file entry structure 104, along with the file information structure 120 and corresponding extent block 122.

The file structures 102, 104, 108, 110, 124, 126, and 128 are each file entry structures. The file structure 106 is a directory entry structure. The file structures 112, 114, 120, and 130–136 are each file information structures. The file structures 116, 118, 122, and 138–144 are each extent blocks.

Each file entry structure 102, 104, 108, 110, 124, 126, and 128 contains a sibling pointer and a child pointer. The child pointer of a file entry structure points to a file information structure. The sibling pointer of a file entry structure points to a directory entry structure or file entry structure on the same level in the file system hierarchy 220.

For example, the sibling pointer of the file entry structure 102 points to the file entry structure 104, and the sibling pointer of the file entry structure 104 points to the directory entry structure 106. The child pointer of the file entry structure 102 points to the file information structure 112, and the child pointer of the file entry structure 104 points to the file information structure 120.

Each directory entry structure contains a sibling pointer and a child pointer. The child pointer of a directory entry structure points to a sub directory of the corresponding directory. The sibling pointer of a directory entry structure points to a directory entry structure or file entry structure on the same level in the file system hierarchy 220.

For example, the sibling pointer of the directory entry structure 106 points to the file entry structure 108. The child pointer of the directory entry structure 106 points to the file entry structure 124.

A null sibling pointer in a file entry structure or a directory entry structure indicates the end of a sibling chain. For example, the child pointer of the file entry structure 110 is null to indicate the end of the sibling chain on the root directory 100 level of the file system hierarchy 220.

Each file information structure 112, 114, 120, and 130–136 contains an extent pointer and a child pointer. The extent pointer of a file information structure points to a corresponding extent block. The child pointer of a file information structure points to a next file information structure in a file information chain for the corresponding file.

For example, extent pointer of the file information structure 112 points to the extent block 116, and the extent pointer of the file information structure 114 points to the extent block 118. The child pointer of the file information structure 112 points to the file information structure 114, and the child pointer of the file information structure 114 is null to indicate that the file information structure 114 is the end of the file information chain for the corresponding file.

Figure 5:
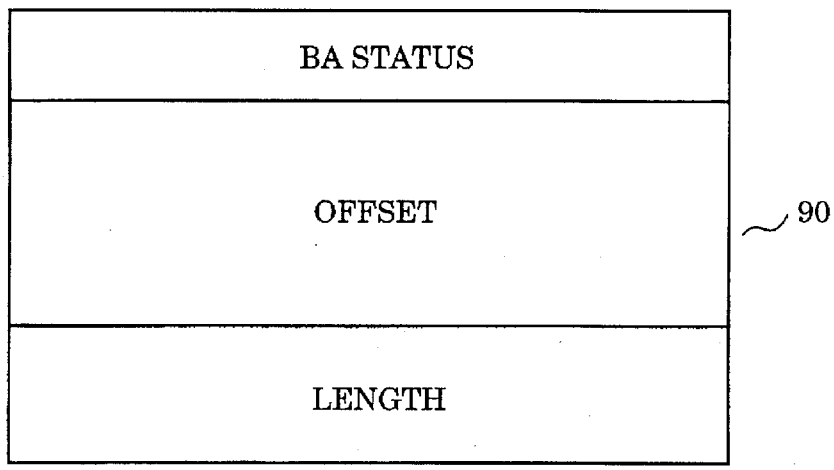
FIG. 5 illustrates the format of a block allocation structure for one embodiment which comprises a block allocation status, an offset, and a length.

FIG. 5 illustrates the format of a block allocation structure 90 for one embodiment. The block allocation structure 90 comprises a block allocation (BA) status, an offset, and a length. The block allocation status includes an exists flag indicating whether the file structure corresponding to the block allocation structure 90 exists or is deleted, and a null status flag indicating whether the corresponding offset is invalid (null). The offset is the physical address offset of the file structure corresponding to the block allocation structure 90. The length indicates the length (in bytes) of the file structure corresponding to the block allocation structure 90.

Figure 6:
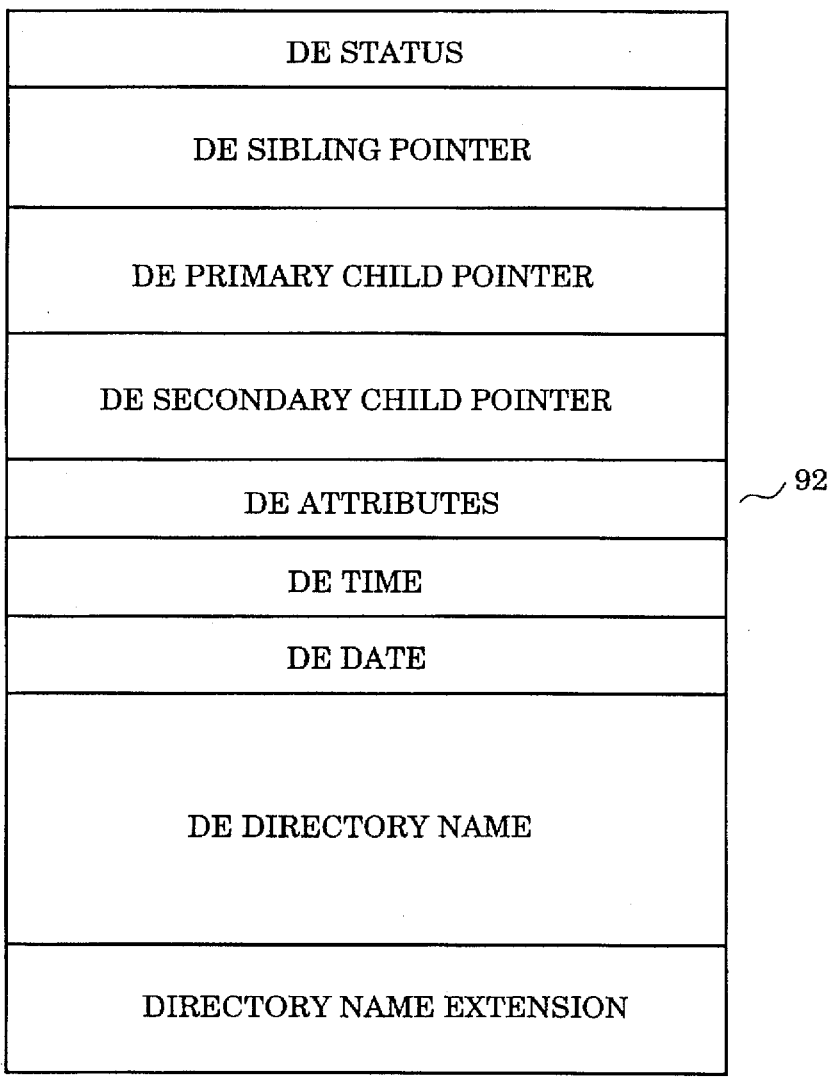
FIG. 6 illustrates the format of a directory entry structure for one embodiment which comprises a DE status, a DE sibling pointer, DE child pointers, and a set of DE parameters.

FIG. 6 illustrates the format of a directory entry structure 92 for one embodiment. The directory entry structure 92 comprises a DE status, a DE sibling pointer, a primary and a secondary DE child pointer, and a set of DE parameters. Either the primary or the secondary DE child pointer is employed as the DE child pointer for the directory entry structure 92.

The DE status includes an exists flag that indicates whether the corresponding directory entry structure exists or is deleted. The DE status also includes null flags that indicate whether the DE sibling pointer and the DE child pointers are null.

The DE sibling pointer is a pointer to the next sibling directory entry structure or file entry structure at the same level in the file system hierarchy. If the DE sibling pointer is null, the directory entry structure 92 is the last entry in a sibling chain.

The DE child pointer is a pointer to a child directory entry structure or child file entry structure at the next level down in the file system hierarchy. The DE child pointer is null if the directory entry structure 92 is the last entry in a chain.

FIG. 7 illustrates the format of a file entry structure 94 for one embodiment. The file entry structure 94 comprises an FE status, an FE sibling pointer, an FE child pointer (primary and secondary), and a set of FE parameters. Either the primary or the secondary FE child pointer is employed as the FE child pointer for the file entry structure 94.

The FE status includes an exists flag that indicates whether the file entry structure 94 exists or whether the file entry structure 94 is deleted. The FE status also contains null flags that indicate whether the FE child pointers and the FE sibling pointer of the file entry structure 94 are null.

The FE sibling pointer provides a pointer to the next sibling file entry structure or directory entry structure at the same level in the file system hierarchy as the file entry structure 94. The FE sibling pointer is null if the file entry structure 94 is the last entry in a sibling chain.

The FE child pointer is a pointer to the first file information structure corresponding to the file entry structure 94.

The FE parameters provide directory information fields for a set of attributes, a time stamp, a data stamp, a file name, and a file name extension. The FE attributes provide attribute information for the file entry structure 94. The FE attributes includes file attributes such as read only file, hidden file, system file, a volume label, and archive information.

Figure 8:
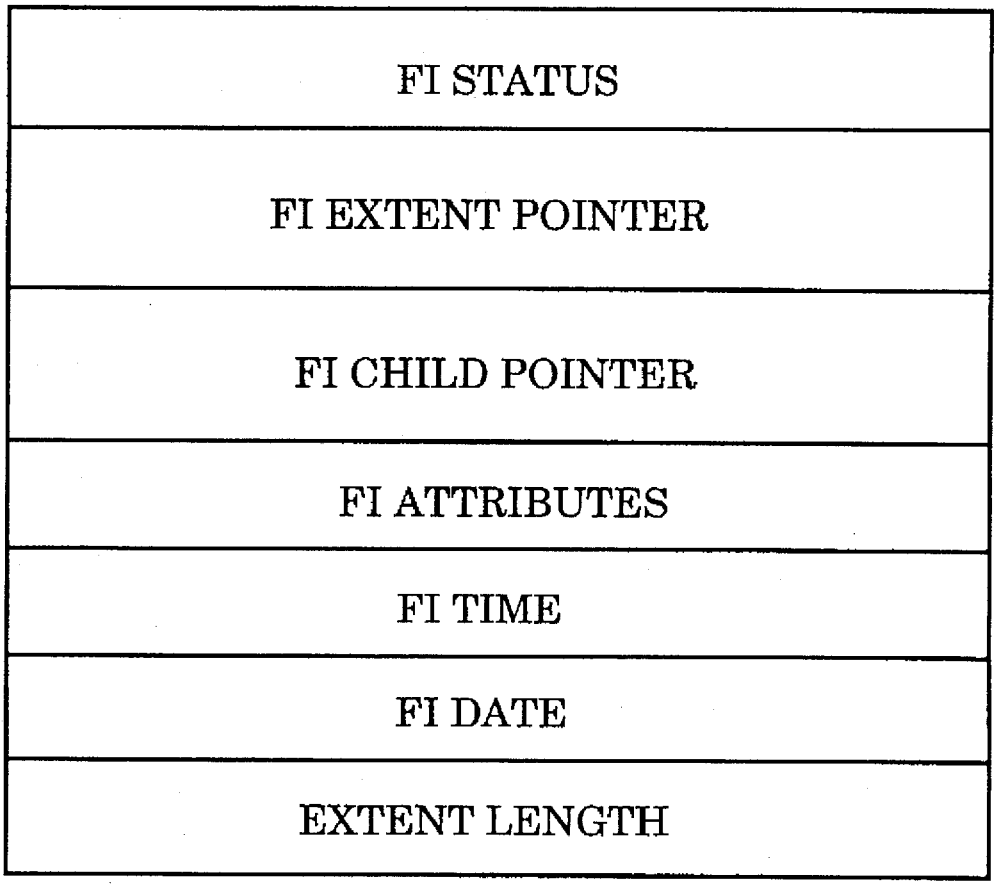
FIG. 8 illustrates the format of a file information structure for one embodiment which comprises an FI status, an FI extent pointer, FI child pointers, and a set of FI parameters.

FIG. 8 illustrates the format of a file information structure 96 for one embodiment. The file information structure 96 comprises an FI status, an FI extent pointer, FI child pointers, and a set of FI parameters.

The FI status includes an exists flag that indicates whether or not the file information structure 96 exists or is deleted. The FI status also includes null flags that indicate whether the FI extent pointer and the FI child pointers of the file information structure 96 are null.

The FI extent pointer is a pointer to an extent block corresponding to the file information structure 96.

The FI child pointers are pointers to a next file information structure in the file information chain corresponding to the file information structure 96. The FI child pointers are null to indicate the end of the file information chain.

Figure 9:
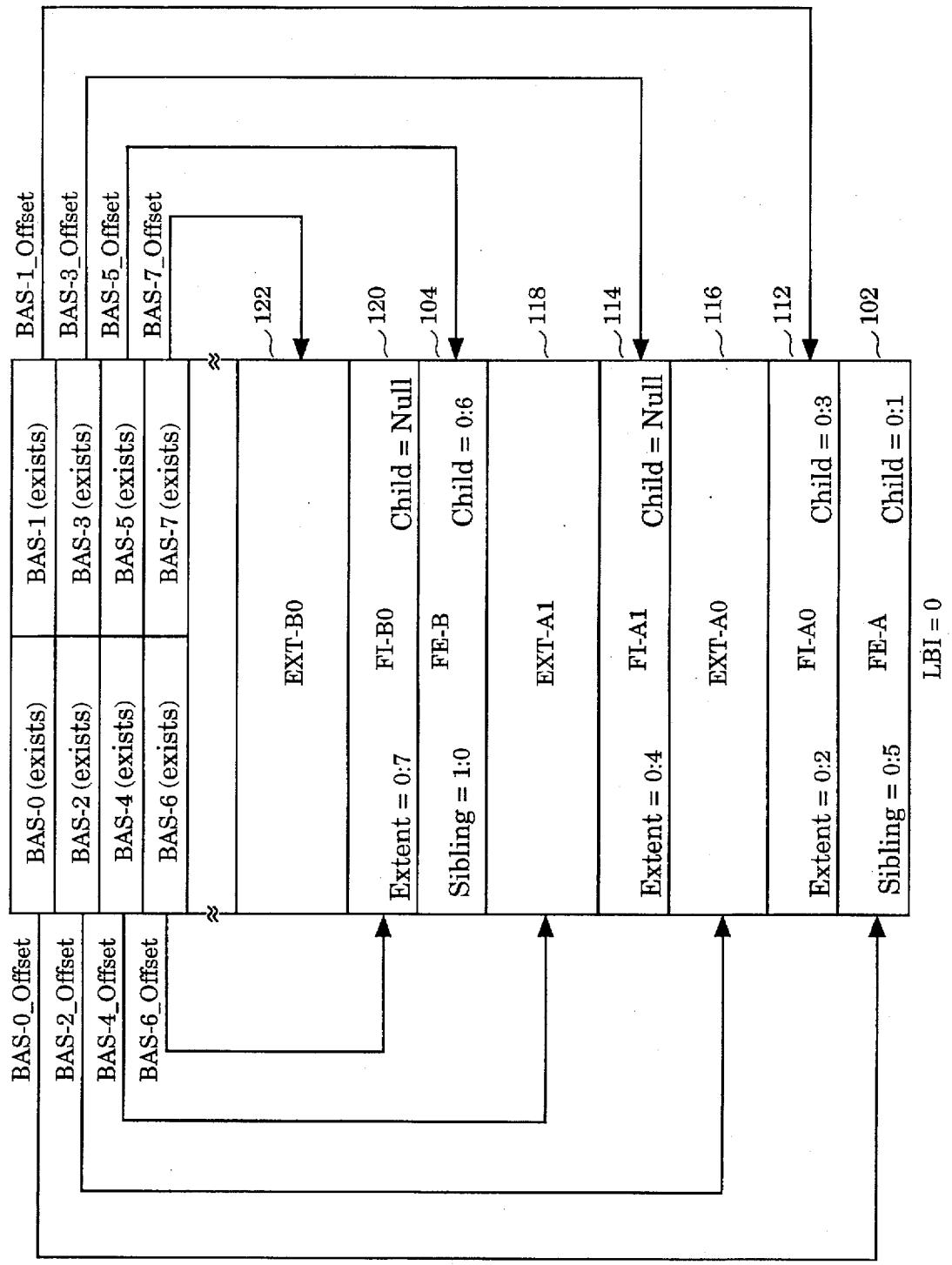
FIG. 9 illustrates an example arrangement of file structures for the file system hierarchy stored in one of the logical blocks.

FIG. 9 illustrates an example arrangement of file structures for the file system hierarchy 220 stored in the logical block 80. For the example shown, the logical block 80 is programmed with an LBI=0. The file structures in the logical block 80 include the file entry structure 102 (FE-A), the file information structure 112 (FI-A0), the extent block 116 (EXT-A0), the file information structure 114 (FI-A1), the extent block 118 (EXT-A1), the file entry structure 104 (FE-B), the file information structure 120 (FI-B0), and the extent block 122 (EXT-B0).

The CPU 24 executing the flash memory file system 70 and flash memory card driver 72 software maintains a set of block allocation structures BAS-0 through BAS-7 in the logical block 80. The block allocation structures BAS-0 through BAS-7 provide a logical reference to physical address mapping for the file structures contained in the logical block 80.

For example, the offset of the BAS-0 (BAS-0_offset) provides the physical address offset of the file entry structure 102 in relation to a base physical address for the logical block 80. Similarly, the offset of the BAS-1 (BAS-1_offset) provides a logical to physical address mapping for the file information structure 112. The BAS-2_offset maps the extent block 116, the BAS-3_offset maps the file information structure 114, the BAS-4_offset maps the extent block 118, the BAS-5_offset maps the file entry structure 104, the BAS-6_offset maps the file information structure 120, and the BAS-7_offset maps the extent block 122, The BAS-0 through BAS-7 correspond to a set of logical pointers in the range 0–7 for the logical block 80. The combination of the logical block identifier for the logical block 80 and the logical pointers comprises the logical references for the file structures stored in the logical block 80. The CPU 24 traverses the portion of the file system hierarchy 220 stored in the logical block 80 by using the block allocation structures BAS-0 through BAS-7 to translate the sibling, child, and extent pointers of the file structures into physical addresses as appropriate.

For example, the CPU 24 traverses the hierarchy from the file entry structure 102 to the extent block 122 through the block allocation structures BAS-0 through BAS-7. The root directory 100 contains a sibling pointer equal to logical block 0, logical pointer 0 (0:0). The sibling pointer of 0:0 for the root directory 100 causes the CPU 24 to read the block allocation structure specified by the sibling pointer of 0:0 to access the next file structure in the sibling chain at the root directory 100 level. The root sibling pointer of 0:0 points to the block allocation structure BAS-0 of the logical block 80 because the logical block 80 is programmed with an LBI=0.

The block allocation structure BAS-0 directs the CPU 24 to the file entry structure 102 with the BAS-0_offset. The CPU 24 traverses the sibling chain by reading the FE sibling pointer from the file entry structure 102. The FE sibling pointer (equal to 0:5) points to the block allocation structure BAS-5 of the logical block 80 for the next file structure in the sibling chain. The block allocation structure BAS-5 points to the file entry structure 104 with the BAS-5_offset.

The CPU 24 continues to traverse the sibling chain at the root directory 100 level by reading the FE sibling pointer from the file entry structure 104. The FE sibling pointer (equal to 1:0) points to the block allocation structure 0 of the logical block 84 (having a programmed LBI=1) for the next file structure in the sibling chain. The block allocation structure 0 of the logical block 84 points to the directory entry structure 106.

The CPU 24 locates the file information chain corresponding to the file entry structure 102 by reading the FE child pointer of the file entry structure 102. The FE child pointer equal to 0:1 points to the block allocation structure BAS-1. The block allocation structure BAS-1 points to the file information structure 112 through the BAS-1_offset. The FI extent pointer equal to 0:2 of the file information structure 112 points to the extent block 116 through the BAS-2_offset of the block allocation structure BAS-2.

The FI child pointer of the file information structure 112 points to the file information structure 114 as the next file information structure in the file information chain corresponding to the file entry structure 102. The FI child pointer equal to 0:3 points to the file information structure 114 through the BAS-3_offset of the block allocation structure BAS-3. The FI extent pointer equal to 0:4 of the file information structure 112 points to the extent block 118 through the BAS-4_offset. The null FI child pointer of the file information structure 114 indicates the end of the file information chain corresponding to the file entry structure 102.

The CPU 24 locates the file information chain corresponding to the file entry structure 104 by reading the FE child pointer equal to 0:6 which points to the block allocation structure BAS-6. The block allocation structure BAS-6 points to the file information structure 120 through the BAS-6_offset. The FI extent pointer equal to 0:7 of the file information structure 120 points to the extent block 122 through the BAS-7_offset. The null FI child pointer of the file information structure 120 indicates the end of the file information chain corresponding to the file entry structure 104.

Figure 10:
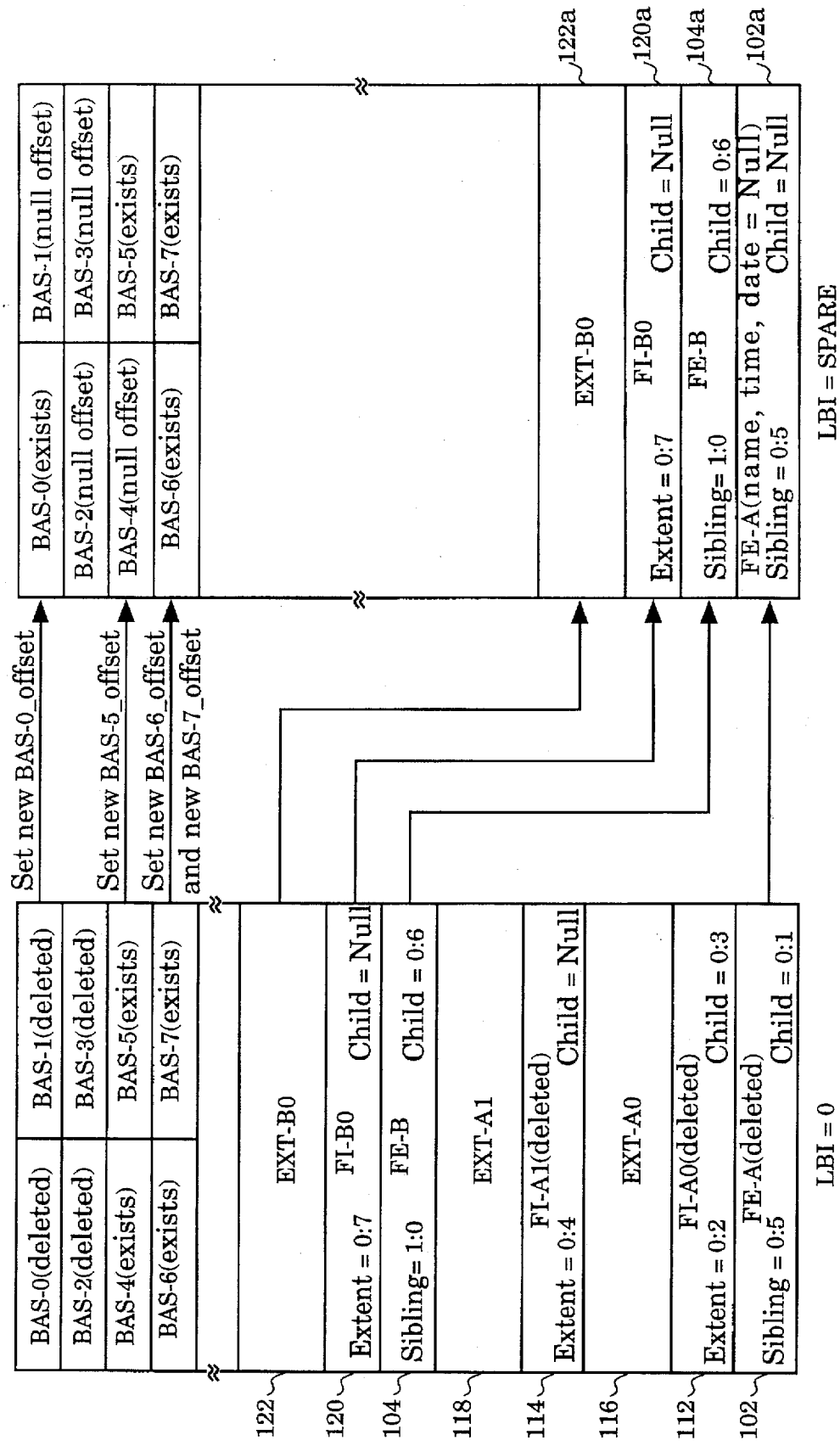
FIG. 10 illustrates a clean-up operation on a logical block after the file-A is deleted from the file system hierarchy.

FIG. 10 illustrates a clean-up operation on the logical block 80 after the file-A is deleted from the file system hierarchy 220. The CPU 24 cleans-up the logical block 80 by compressing the block allocation structures and file structures from the logical block 80 into the spare logical block 81.

The CPU 24 deletes the file-A by deleting the file entry structure 102, the file information structures 112 and 114 and the corresponding extent blocks 116 and 118. The CPU 24 deletes the file entry structure 102 by programming the exists flag in the FE status of the file entry structure 102 to indicate deleted. The CPU 24 also programs the exists flag in the BA status of the block allocation structure BAS-0 to indicate that the corresponding file structure 102 is deleted.

The CPU 24 deletes the file information structures 112 and 114 by programming the exists flags in the FI status of the file information structures 112 and 114 to indicate deleted. The CPU 24 also programs the exists flags in the BA status of the block allocation structures BAS-1 and BAS-3 to indicate that the corresponding file structures 112 and 114 are deleted.

The CPU 24 deletes the extent blocks 116 and 118 by programming the exists flags in the BA status of the block allocation structures BAS-2 and BAS-4 corresponding to the extent blocks 116 and 118 to indicate deleted file structures.

During the clean-up of logical block 80, the CPU 24 recycles the deleted file entry structure 102. The CPU 24 recycles the deleted file entry structure 102 by writing a recycled file entry structure 102a into a free area of the spare logical block 81. The CPU 24 copies the FE sibling pointer equal to 0:5 of the file entry structure 102 to the recycled file entry structure 102a. The sibling pointer equal to 0:5 in the file entry structure 102a maintains the sibling chain at the root directory 100 level of the file system hierarchy 220 after the clean-up operation.

The CPU 24 writes the null flags of the FE status in the recycled file entry structure 102a to indicate that the FE child pointer is null. The CPU 24 does not program the null FE child pointer field of the recycled file entry structure 102a and does not program the null FE parameters (name, time, and date stamps) of the recycled file entry structure 102a. The unprogrammed fields of the recycled file entry structure 102a indicate null fields. For one embodiment, the null fields of the cycled file entry structure 102a are all logic ones which can subsequently be programmed without prior erasure of the corresponding flash cells.

The CPU 24 writes the block allocation structure BAS-0 into the spare logical block 81 while setting a new BAS-0_offset to indicate the physical address of the recycled file entry structure 102a in the spare logical block 81. The CPU 24 also sets the exists flag in the BA status of the block allocation structure BAS-0 in the spare logical block 81 to indicate that the recycled file entry structure 102a exists.

The CPU 24 discards the file information structure 112, the extent block 116, the file information structure 114, and the extent block 118 during clean-up of logical block 80. The CPU 24 discards file structures during clean-up of the logical block 80 by not writing corresponding file structures into the spare logical block 81.

The CPU 24 writes block allocation structures BAS-1 through BAS-4 into the spare logical block 81 with null offsets. After the clean-up operation, the null offsets indicate that the block allocation structures BAS-1 through BAS-4 are available for adding new file structures to the logical block 81.

During the clean-up operation, the CPU 24 transfers the file entry structure 104 from the logical block 80 to a corresponding file entry structure 104a in an available area of the spare logical block 81. The CPU 24 also copies the block allocation structure BAS-5 from the logical block 80 to the spare logical block 81. The CPU 24 sets a new BAS-5_offset in the block allocation structure BAS-5 in the spare logical block 81 to indicate the physical address offset of the file entry structure 104a.

The CPU 24 also transfers the file information structure 120 from the logical block 80 to a corresponding file information structure 120a in the spare logical block 81, and transfers the extent block 122 from the logical block 80 to a corresponding extent block 122 in the spare logical block 81. The CPU 24 copies the block allocation structures BAS-6 and BAS-7 to the spare logical block 81, and sets a new BAS-6_offset and a new BAS-7_offset in the block allocation structures BAS-6 and BAS-7 of the spare logical block 81 to reflect the physical addresses of the file information structure 120a and the extent block 122a.

At the end of the clean-up operation on the logical block 80, the CPU 24 programs the logical block identifier of the logical block 81 to LBI=0, and the logical block 81 assumes the place of the logical block 80 in the file system hierarchy 220. The CPU 24 then performs an erase operation on the logical block 80. Thereafter, the logical block 80 is available as a spare logical block.

After the clean-up operation, the null FE child pointer the recycled file entry structure 102a in the logical block 81 indicates an available file entry structure. If a new file is added to the file system hierarchy 220 at the root file 100 level, or if a modified file is written at the root level, the recycled file entry structure 102a is available to store the appropriate file information.

The flash memory file system 70 and the flash memory card driver 72 recognize the null FE child pointer of the recycled file entry structure 102a while traversing the root file 100 level chain to add a new file entry structure. The null FE child pointer of the recycled file entry structure 102a is programmed to point to the first file information structure of the new file, and the FE parameters are programmed for the new file.

Figure 11:
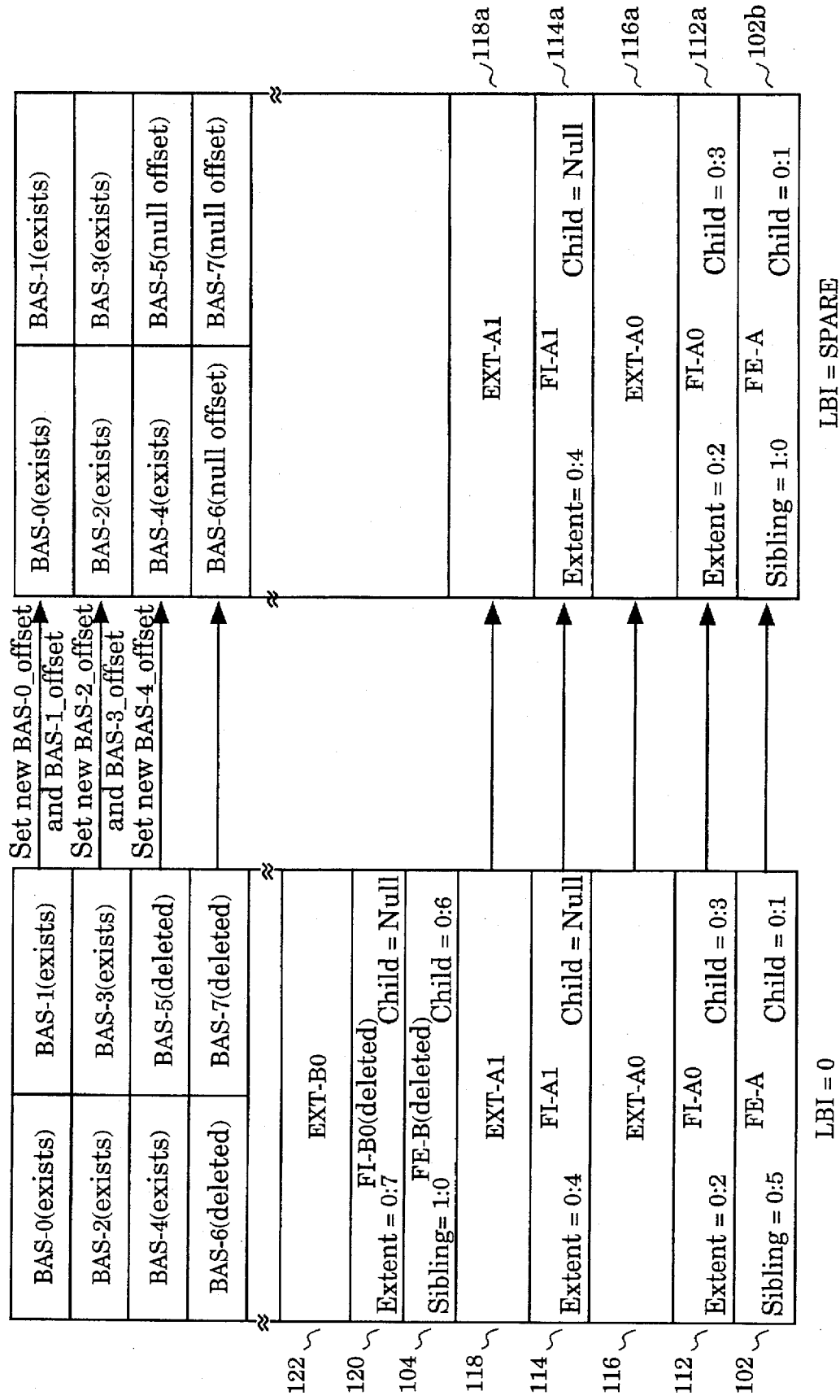
FIG. 11 illustrates a clean-up operation on a logical block after the file-B is deleted from the file system hierarchy.

FIG. 11 illustrates a clean-up operation on the logical block 80 after the file-B is deleted from the file system hierarchy 220. The CPU 24 cleans-up the logical block 80 by compressing the block allocation structures and file structures from the logical block 80 into the spare logical block 81.

The CPU 24 locates the file structures corresponding to file B by traversing a sibling chain from the root directory 100 to the file entry structure 102. The FE sibling pointer of the file entry structure 102 points to the file entry structure 104 through the block allocation structure BAS-5. The CPU 24 reads the FE file name of the file entry structure 104 to determine that the file entry structure 104 corresponds to file B. The FE child pointer equal to 0:6 of the file entry structure 104 points to the file information structure 120 and the FI extent pointer 0:7 of the file information structure 120 points to the extent block 122. The null FI child pointer of the file information structure 120 indicates the end of the file information chain for the file entry structure 104 (File B).

The CPU 24 deletes the file-B by deleting the file entry structure 104, and the file information structure 120 and the corresponding extent block 122. The CPU 24 programs the exists flags in the FE status of the file entry structure 102 and the FI status of the file information structure 120 to indicate deleted file structures. The CPU 24 also programs the exists flags in the BA status of the block allocation structure BAS-5 through BAS-7 to indicate that the corresponding file structures are deleted.

During the clean-up operation, the CPU 24 transfers the undeleted file structures from the logical block 80 to the spare logical block 81 while modifying sibling pointers to bypass the deleted file structures. The CPU 24 transfers the file entry structure 102 into a corresponding file entry structure 102b, and modifies the FE sibling pointer for the file entry structure 102b because the subsequent file structure in the sibling chain (the file entry structure 104) is deleted. The CPU 24 traverses the sibling chain a far as necessary to find the next undeleted file structure in the sibling chain. In this example, the next undeleted file structure is the directory entry structure 106. The CPU 24 programs the FE sibling pointer for the file entry structure 102b equal to 1:0 to point to the directory entry structure 106 stored in the logical block 84 having an LBI=1.

The CPU 24 also transfers the file information structure 112 into a corresponding file information structure 112a, the extent block 116 into a corresponding extent block 116a, the file information structure 114 into a corresponding file information structure 114a, and the extent block 118 into a corresponding extent block 118a.

The CPU 24 transfers the block allocation structures BAS-0 through BAS-4 from the logical block 80 to corresponding block allocation structures BAS-0 through BAS-4 in the spare logical block 81. The CPU 24 programs a new BAS-0_offset through BAS-4_offset in the block allocation structures BAS-0 through BAS-4 in the spare logical block 81 to reflect the physical addresses for the file entry structure 102b, the file information structure 112a, the extent block 116a, the file information structure 114a, and the extent block 118a.

The CPU 24 writes block allocation structures BAS-5 through BAS-7 into the spare logical block 81 with null offsets. After the clean-up operation, the null offsets indicate that the block allocation structures BAS-1 through BAS-4 are available for adding new file structures to the logical block 81. The null offsets in the block allocation structures BAS-5 through BAS-7 can be subsequently programmed to point to the new file structures.

Figure 12:
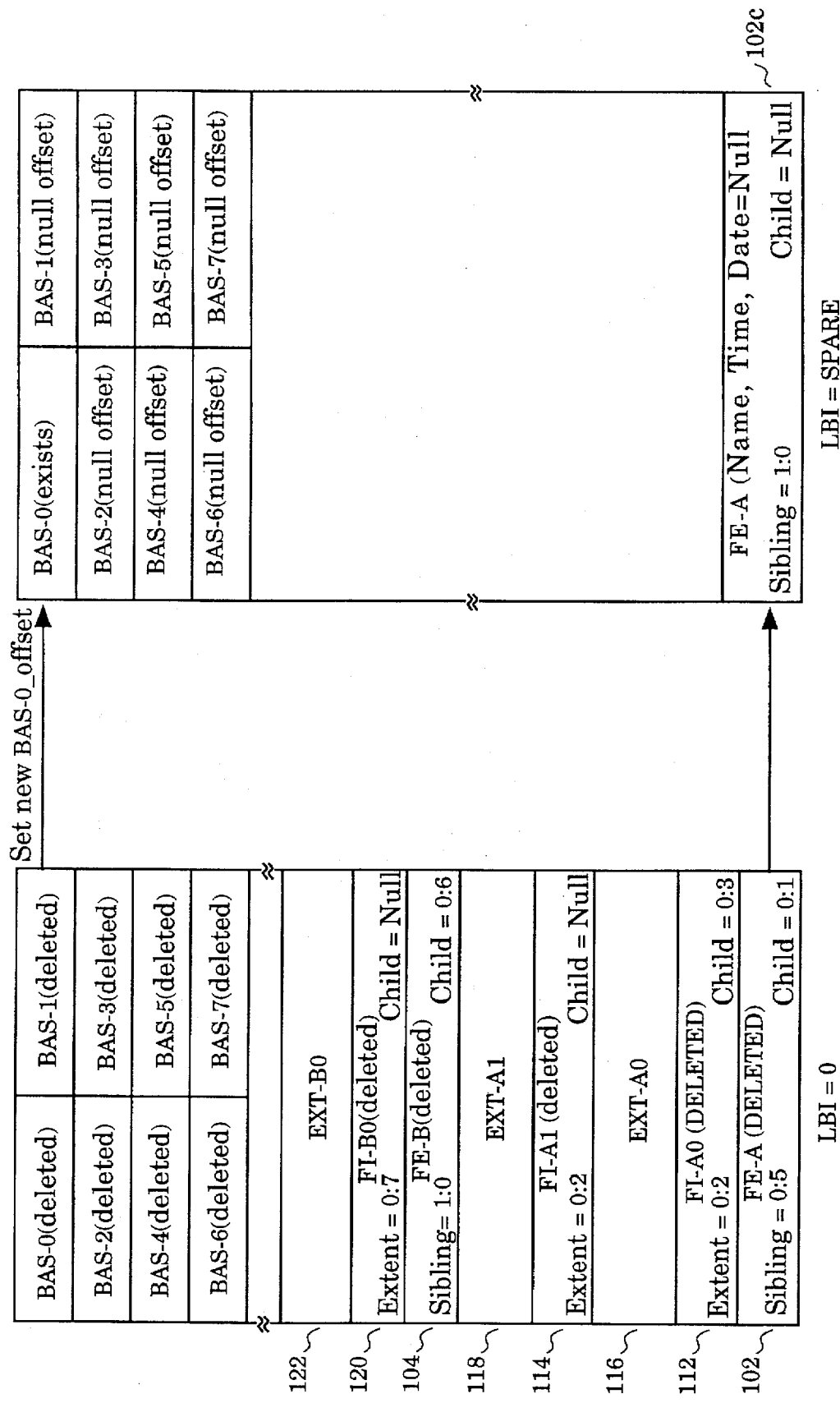
FIG. 12 illustrates a clean-up operation on a logical block after the file-A and the file-B are deleted from the file system hierarchy.

FIG. 12 illustrates a clean-up operation on the logical block 80 after the file-A and the file-B are deleted from the file system hierarchy 220. The CPU 24 cleans-up the logical block 80 by compressing the block allocation structures and file structures from the logical block 80 into the spare logical block 81.

The CPU 24 deletes the file-A by deleting the file entry structure 102, the file information structures 112 and 114 and the corresponding extent blocks 116 and 118 in the manner described above. The CPU 24 deletes the file-B by deleting the file entry structure 104, and the file information structure 120 and the corresponding extent block 122 in the manner described above.

The CPU 24 recycles the deleted file entry structure 102 by writing a recycled file entry structure 102c into a free area of the spare logical block 81 while modifying sibling pointer to bypass the deleted file structures. The CPU 24 modifies the FE sibling pointer for the file entry structure 102c because the subsequent file structure in the sibling chain (the file entry structure 104) is deleted. The CPU 24 traverses the sibling chain a far as necessary to find the next undeleted file structure in the sibling chain (the directory entry structure 106). The CPU 24 programs the FE sibling pointer for the file entry structure 102c equal to 1:0 to point to the directory entry structure 106 stored in the logical block 84 having an LBI=1. The FE sibling pointer equal to 1:0 in the file entry structure 102c maintains the sibling chain at the root directory 100 level of the file system hierarchy 220 after the clean-up operation.

The CPU 24 writes the null flags of the FE status in the recycled file entry structure 102c to indicate that the FE child pointer is null. The CPU 24 does not program the null FE child pointer field of the recycled file entry structure 102c and does not program the null FE parameters (name, time, and date stamps) of the recycled file entry structure 102c. The unprogrammed fields of the recycled file entry structure 102c indicate null fields. The null fields of the cycled file entry structure 102a can subsequently be programmed without prior erasure of the corresponding flash cells.

The CPU 24 writes the block allocation structure BAS-0 into the spare logical block 81 while setting a new BAS-0_offset to indicate the physical address of the recycled file entry structure 102c in the spare logical block 81. The CPU 24 also sets the exists flag in the BA status of the block allocation structure BAS-0 in the spare logical block 81 to indicate that the recycled file entry structure 102c exists.

The CPU 24 discards the deleted file structures 112, 116, 114, 118, 104, 120, and 122 during clean-up of logical block 80. The CPU 24 discards file structures during clean-up of the logical block 80 by not writing corresponding file structures into the spare logical block 81.

The CPU 24 writes block allocation structures BAS-1 through BAS-7 into the spare logical block 81 with null offsets. After the clean-up operation, the null offsets indicate that the block allocation structures BAS-1 through BAS-4 are available for adding new file structures to the logical block 81.

Figure 13:
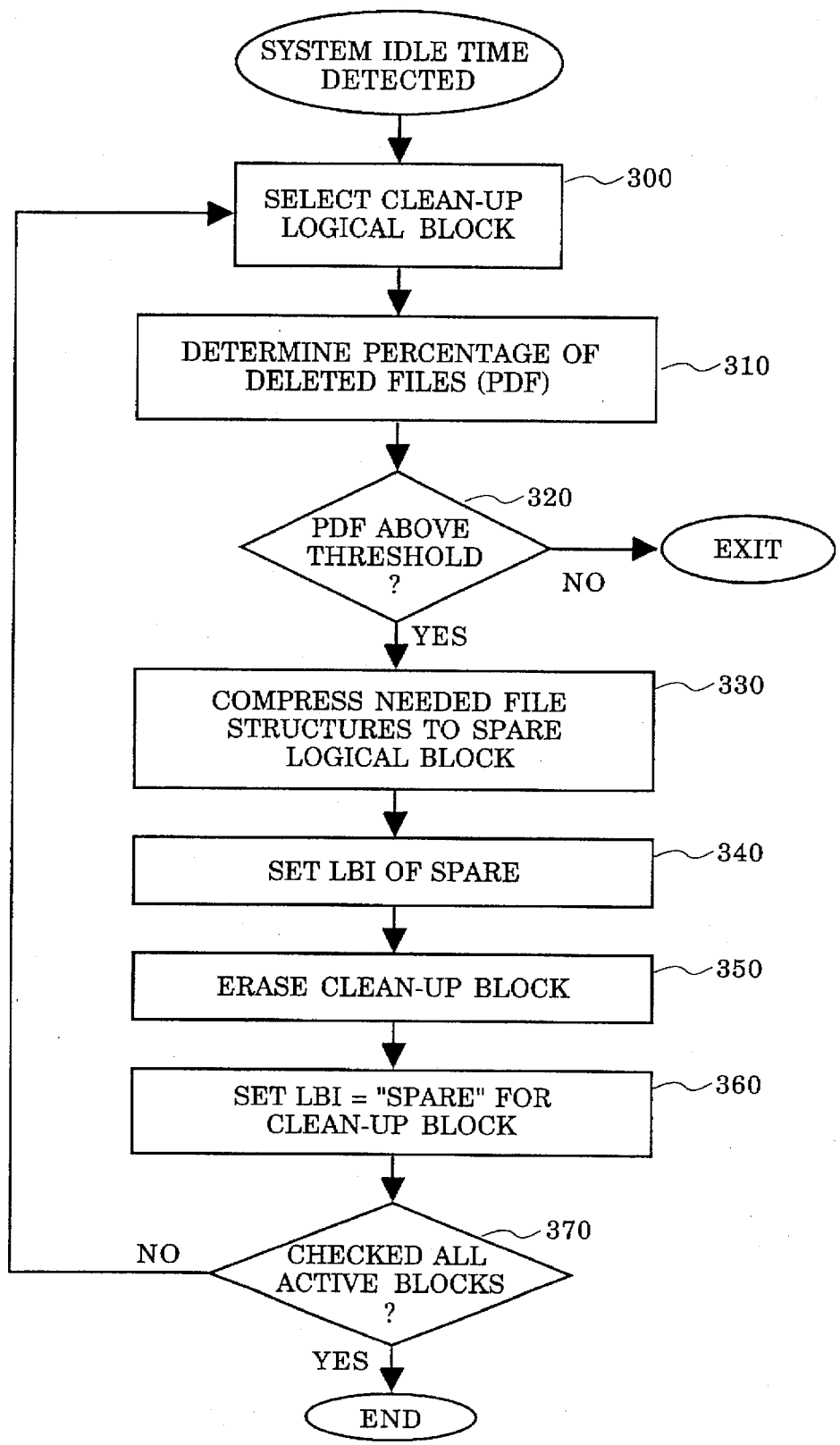
FIG. 13 is a flow diagram illustrating the flash block clean-up task which is a proactive process of the computer system for performing clean-up operations on the logical blocks.

FIG. 13 is a flow diagram illustrating the flash block clean-up task 78. The flash block clean-up task 78 is a proactive process of the computer system 200 for performing clean-up operations on the logical blocks 80–85. For one embodiment, the flash block clean-up task 78 is driven by the timer ticks mechanism of MS DOS. For another embodiment, the flash block clean-up task 78 is executed during idle time of the CPU 24 with an event driven operating system.

At block 300, the CPU 24 checks a clean-up logical block from the logical blocks 80–85. The CPU 25 searches through the logical blocks 80–85 sequentially according to the logical block identifier programmed into each logical block 80–85.

At block 310, the CPU 24 determines a percentage of deleted files (PDF) contained in the clean-up logical block. The CPU 24 determines the PDF by reading the assembling information from the block allocation structures of the clean-up logical block. The block allocation structures indicate the number of "deleted" file structures, the number of "exists" file structures, and the number of bytes in the file structures.

At decision block 320, the CPU 24 determines whether the PDF for the clean-up logical block is above a predetermined threshold. If the PDF is above the predetermined threshold at derision block 320, then control proceeds to block 330. If the PDF is not above the predetermined threshold at decision block 320, then the flash block clean-up task 78 exits and later checks the next logical block.

At block 330, the CPU 24 compresses the needed file structures from the clean-up logical block to the spare flash block. The needed file structures include undeleted file entry structures, undeleted file information structures, undeleted extent blocks, and undeleted directory entry structures. The needed file structures also include externally referenced deleted file structures that are necessary to maintain sibling chains.

The CPU 24 collapses sibling chains while compressing file structures into the spare flash block. The CPU 24 collapses a sibling chain by traversing the sibling chain and modifying sibling pointers to bypass deleted file structures. For each file structure in a sibling chain, the CPU 24 traverses ahead along the sibling chain while searching for a next undeleted file structure in the sibling chain. The CPU 24 then programs the sibling pointer of the file structure to point to the next undeleted file structure in the sibling chain when the file structure is transferred to the spare logical block.

The CPU 24 discards deleted file structures by not transferring the deleted file structures from the clean-up logical block to the spare logical block. The CPU 24 also sets unprogrammed "null" offsets in the block allocation structures in the spare logical block that correspond to the deleted file structures. The null offsets enable later use of the block allocation structures.

The CPU 24 recycles deleted file entry and directory entry structures that are referenced by file structures stored in logical blocks other than the clean-up logical block. Such deleted file entry and directory entry structures cannot be discarded because a sibling chain through the external reference must be maintained. The CPU 24 recycles a deleted file structure by transferring the deleted file structure from the clean-up logical block to the spare logical block and setting null child pointer and file parameters in the spare logical block. The null child pointer and parameters enable later programming and reuse of the recycled file structure when adding a new file or directory.

Thereafter at block 340, the CPU 24 programs the logical block identifier of the spare logical block to the logical block identifier of the clean-up logical block. At block 350, the CPU 24 performs an erase operation on the clean-up logical block. Thereafter at block 360, the CPU 24 programs the logical block identifier of the clean-up logical flash block to "spare" (LBI=spare).

At block decision 370, the CPU 24 determines whether all active logical blocks have been checked. Control proceeds back to block 300 to select a next logical block for clean up if not all active logical blocks have been checked at decision block 370.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method of cleaning up a logical block of a flash memory subsystem, the method comprising the steps of:

transferring information from block allocation structures and file structures of a first logical block of a flash memory subsystem having a first logical block identifier to corresponding block allocation structures and file structures of a second logical block of the flash memory subsystem having a second logical block identifier, the block allocation structures in each logical block storing physical address offsets for the file structures, the file structures including directory entry structures that specify directories, file entry structures that specify files, and file information structures with corresponding extent blocks that store file data, the directory entry and file entry data structures forming a linked list file structure that defines a file system hierarchy, and the file information structures linking the extent blocks to the file system hierarchy;

compressing the file structures into the second logical block by discarding deleted file information structures and extent blocks and modifying the linked list hierarchy to eliminate deleted file entry and directory entry structures;

reprogramming the logical block identifier of the second logical block to reflect the logical block identifier of the first logical block;

erasing the first logical block; and programming the logical block identifier of the first logical block to reflect a cleaned up status.

2. The method of claim 1 wherein the step of compressing the file structures comprises the steps of:

accessing a current file structure by traversing a sibling chain of the file structures stored in the first logical block in the flash memory subsystem, the sibling chain specified by a sibling pointer stored in each file structure;

if the current file structure is not deleted, accessing a next undeleted file structure from the file structures by traversing ahead through the sibling chain, then transferring the current file structure to the second logical block and programming the sibling pointer of the current file structure in the second logical block to point to the next undeleted file structure in the sibling chain;

if the current file structure is deleted, then transferring the current file structure to the second logical block and setting a child pointer of the current file structure in the second logical block to null, such that the null child pointer is programmable without prior erasure.

3. The method of claim 2, wherein the step of transferring the current file structure to the second logical block further comprises the step of transferring a child file structure corresponding to the current file structure from the first logical block to the second logical block.

4. The method of claim 3, wherein the child file structure corresponding to the current file structure is specified by a child pointer stored in the current file structure.

5. The method of claim 4, wherein if the current file structure is one of the directory entry structures, the child file structure is one of the file entry structures.

6. The method of claim 4, wherein if the current file structure is one of the directory entry structures, the child file structure is a child directory entry structure containing a set of child directory parameters that define a child directory.

7. The method of claim 4, wherein if the current file structure is one of the file entry structures, the child file structure comprises a file information structure specifying an extent block.

8. The method of claim 7, further comprising the step of transferring the extent block specified by the file information structure from the first logical block to the second logical block.

9. The method of claim 8, wherein the extent block is specified by an extent pointer stored in the file information structure.

10. The method of claim 9, further comprising the step of transferring a child file information structure specified by the file information structure from the first logical block to the second logical block.

11. The method of claim 10, wherein the child file information structure is specified by a child file information pointer stored in the file information structure.

12. An apparatus for cleaning up a logical block of a flash memory subsystem, the apparatus comprising:

means for transferring information from block allocation structures and file structures of a first logical block of a flash memory subsystem having a first logical block identifier to corresponding block allocation structures and file structures of a second logical block of the flash memory subsystem having a second logical block identifier, the block allocation structures in each logical block storing physical address offsets for the file structures, the file structures including directory entry structures that specify directories, file entry structures that specify files, and file information structures with corresponding extent blocks that store file data, the directory entry and file entry data structures forming a linked list file structure that defines a file system hierarchy, and the file information structures linking the extent blocks to the file system hierarchy;

means for compressing the file structures into the second logical block by discarding deleted file information structures and extent blocks and modifying the linked list hierarchy to eliminate deleted file entry and directory entry structures;

means for reprogramming the logical block identifier of the second logical block to reflect the logical block identifier of the first logical block;

means for erasing the first logical block; and means for programming the logical block identifier of the first logical block to reflect a cleaned up status.

13. The apparatus of claim 12 wherein the means for compressing the file structures further comprises:

means for accessing a current file structure by traversing a sibling chain of the file structures stored in the first logical block in the flash memory subsystem, the sibling chain specified by a sibling pointer stored in each file structure;

means for accessing a next undeleted file structure from the file structures by traversing ahead through the sibling chain, then transferring the current file structure to the second logical block and programming the sibling pointer of the current file structure in the second logical block to point to the next undeleted file structure in the sibling chain if the current file structure is not deleted;

means for transferring the current file structure to the second logical block and setting a child pointer of the current file structure in the second logical block to null, such that the null child pointer is programmable without prior erasure of the current file structure is deleted.

14. The apparatus of claim 13, wherein the means for transferring the current file structure to the second logical block further comprises means for transferring a child file structure corresponding to the current file structure from the first logical block to the second logical block.

15. The apparatus of claim 14, wherein the child file structure corresponding to the current file structure is specified by a child pointer stored in the current file structure.

16. The apparatus of claim 15, wherein if the current file structure is one of the directory entry structures, the child file structure is one of the file entry structures.

17. The apparatus of claim 15, wherein if the current file structure is one of the directory entry structures, the child file structure is a child directory entry structure containing a set of child directory parameters that define a child directory.

18. The apparatus of claim 15, wherein if the current file structure is one of the file entry structures, the child file structure comprises a file information structure specifying an extent block.

19. The apparatus of claim 18, further comprising means for transferring the extent block specified by the file information structure from the first logical block to the second logical block.

20. The apparatus of claim 19, wherein the extent block is specified by an extent pointer stored in the file information structure.

21. The apparatus of claim 20, further comprising means for transferring a child file information structure specified by the file information structure from the first logical block to the second logical block.

22. The apparatus of claim 21, wherein the child file information structure is specified by a child file information pointer stored in the file information structure.

23. A method of cleaning up a logical block of a flash memory subsystem of a computer system, the method comprising the steps of:

detecting an idle time of an operating system executing on a central processing unit in a computer system;

transferring information from block allocation structures and file structures of a first logical block of a flash memory subsystem of the computer system having a first logical block identifier to corresponding block allocation structures and file structures of a second logical block of the flash memory subsystem of the computer system having a second logical block identifier after the idle time is detected, the block allocation structures in each logical block storing physical address offsets for the file structures, the file structures including directory entry structures that specify directories, file entry structures that specify files, and file information structures with corresponding extent blocks that store file data, the directory entry and file entry data structures forming a linked list file structure that defines a file system hierarchy, and the file information structures linking the extent blocks to the file system hierarchy;

compressing the file structures into the second logical block by discarding deleted file information structures and extent blocks and modifying the linked list hierarchy to eliminate deleted file entry and directory entry structures;

reprogramming the logical block identifier of the second logical block to reflect the logical block identifier of the first logical block;

erasing the first logical block; and programming the logical block identifier of the first logical block to reflect a cleaned up status.

24. The method of claim 23, wherein the step of compressing the file structures further comprises:

accessing a current file structure by traversing a sibling chain of the file structures stored in the first logical block in the flash memory subsystem, the sibling chain specified by a sibling pointer stored in each file structure;

if the current file structure is not deleted, accessing a next undeleted file structure from the file structures by traversing ahead through the sibling chain, then transferring the current file structure to the second logical block and programming the sibling pointer of the current file structure in the second logical block to point to the next undeleted file structure in the sibling chain;

if the current file structure is deleted, then transferring the current file structure to the second logical block and setting a child pointer of the current file structure in the second logical block to null, such that the null child pointer is programmable without prior erasure.

25. The method of claim 24, wherein the step of transferring the current file structure to the second logical block further comprises the step of transferring a child file structure corresponding to the current file structure from the first logical block to the second logical block.

26. The method of claim 25, wherein the child file structure corresponding to the current file structure is specified by a child pointer stored in the current file structure.

27. The method of claim 26, wherein if the current file structure is one of the directory entry structures, the child file structure is one of the file entry structures.

28. The method of claim 26, wherein if the current file structure is one of the directory entry structures, the child file structure is a child directory entry structure containing a set of child directory parameters that define a child directory.

29. The method of claim 26, wherein if the current file structure is one of the file entry structures, the child file structure comprises a file information structure specifying an extent block.

30. The method of claim 29, further comprising the step of transferring the extent block specified by the file information structure from the first logical block to the second logical block.

31. The method of claim 30, wherein the extent block is specified by an extent pointer stored in the file information structure.

32. The method of claim 31, further comprising the step of transferring a child file information structure specified by the file information structure from the first logical block to the second logical block.

33. The method of claim 32, wherein the child file information structure is specified by a child file information pointer stored in the file information structure.

* * * * *

UNITED STATES PATENT AND TRADEMARK OFFICE
CERTIFICATE OF CORRECTION

PATENT NO. : 5,682,497
DATED : October 28, 1997
INVENTOR(S) : Kurt B. Robinson It is certified that error appears in the above-identified patent and that said Letters Patent is hereby corrected as shown below:

In column 6 at line 55 delete "deans" and insert --cleans--

In column 14 at line 26 delete "derision" and insert --decision--

In column 15 at line 10 delete "dean" and insert --clean--

In column 15 at line 11 delete "derision" and insert --decision--

In column 17 at line 16 delete "of" and insert --if--

Signed and Sealed this

Twenty-eighth Day of April, 1998

*Attest:*

BRUCE LEHMAN

*Attesting Officer*  *Commissioner of Patents and Trademarks*